US012020849B2

(12) United States Patent
Cho et al.

(10) Patent No.: US 12,020,849 B2
(45) Date of Patent: Jun. 25, 2024

(54) COIL COMPONENT

(71) Applicant: SAMSUNG ELECTRO-MECHANICS CO., LTD., Suwon-si (KR)

(72) Inventors: Sung Nam Cho, Suwon-si (KR); Jae Youn Park, Suwon-si (KR); Jin Won Lee, Suwon-si (KR); Ji Soo You, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 672 days.

(21) Appl. No.: 17/166,384

(22) Filed: Feb. 3, 2021

(65) Prior Publication Data

US 2022/0165485 A1 May 26, 2022

(30) Foreign Application Priority Data

Nov. 23, 2020 (KR) ........................ 10-2020-0157987

(51) Int. Cl.

*H01F 27/29* (2006.01)
*H01F 17/00* (2006.01)
*H01F 27/32* (2006.01)
*H01F 27/34* (2006.01)

(52) U.S. Cl.

CPC ....... *H01F 27/292* (2013.01); *H01F 17/0013* (2013.01); *H01F 27/324* (2013.01); *H01F 2017/002* (2013.01)

(58) Field of Classification Search

CPC .. H01F 27/292; H01F 17/0013; H01F 27/324; H01F 2017/002

See application file for complete search history.

(56) References Cited

U.S. PATENT DOCUMENTS

| | | | | |
|---|---|---|---|---|
| 10,650,948 | B2 * | 5/2020 | Kim | H01F 5/00 |
| 2013/0222101 | A1 * | 8/2013 | Ito | H01F 3/08 336/83 |
| 2015/0035634 | A1 * | 2/2015 | Nakamura | H01F 41/046 336/170 |
| 2017/0032884 | A1 * | 2/2017 | Choi | H01F 41/046 |
| 2017/0178790 | A1 * | 6/2017 | Kim | H01F 27/2804 |
| 2017/0345556 | A1 * | 11/2017 | Kim | H01F 17/0013 |
| 2018/0308612 | A1 * | 10/2018 | Park | H01F 27/29 |
| 2019/0013141 | A1 * | 1/2019 | Yoon | H01F 27/292 |
| 2019/0051446 | A1 * | 2/2019 | Park | H01F 27/32 |
| 2019/0180913 | A1 * | 6/2019 | Moon | H01F 27/2804 |

(Continued)

FOREIGN PATENT DOCUMENTS

| | | |
|---|---|---|
| KR | 10-2019-0004914 A | 1/2019 |
| KR | 10-2022-0009212 A | 1/2022 |

*Primary Examiner* — Malcolm Barnes

(74) *Attorney, Agent, or Firm* — Morgan, Lewis & Bockius LLP

(57) ABSTRACT

A coil component includes a body, a support substrate disposed within the body, a lead portion disposed on a first surface of the support substrate, a first insulating layer disposed on the first surface of the support substrate to cover the lead portion, a coil unit including a plurality of turns disposed on the first insulating layer, a second insulating layer covering the coil unit, and first and second external electrodes spaced apart from each other on the body, and connected to the coil unit and the lead portion, respectively.

20 Claims, 5 Drawing Sheets

(56) References Cited

U.S. PATENT DOCUMENTS

| | | | | |
|---|---|---|---|---|
| 2019/0198223 | A1* | 6/2019 | Kim | H01F 17/04 |
| 2019/0287711 | A1* | 9/2019 | Kim | H01F 27/2804 |
| 2022/0020523 | A1 | 1/2022 | Yoon et al. | |

* cited by examiner

COIL COMPONENT

CROSS-REFERENCE TO RELATED APPLICATION

This application claims the benefit of priority to Korean Patent Application No. 10-2020-0157987 filed on Nov. 23, 2020 in the Korean Intellectual Property Office, the disclosure of which is incorporated herein by reference in its entirety.

TECHNICAL FIELD

The present disclosure relates to a coil component.

BACKGROUND

An inductor, one of the coil components, is a typical passive electronic component used in electronic devices along with a resistor and a capacitor.

As electronic devices increasingly have higher performance and become compact, a larger number of electronic components are used in electronic devices and electronic components and are reduced in size.

Typically, in the case of a thin-film type coil component, a coil pattern is formed on both surfaces of a support substrate by plating.

SUMMARY

An aspect of the present disclosure may provide a coil component which is formed to be thinned.

According to an aspect of the present disclosure, a coil component may include: a body; a support substrate disposed within the body; a lead portion disposed on a first surface of the support substrate; a first insulating layer disposed on the first surface of the support substrate to cover the lead portion; a coil unit including a plurality of turns disposed on the first insulating layer; a second insulating layer covering the coil unit; and first and second external electrodes spaced apart from each other on the body, and connected to the coil unit and the lead portion, respectively.

According to another aspect of the present disclosure, a coil component may include: a body including a support substrate, a coil unit including a plurality of turns, and a first insulating layer, wherein the first insulating layer and the coil unit are sequentially stacked on a first surface of the support substrate in an order of the support substrate, the first insulating layer, and the coil unit; a lead portion disposed between the first insulating layer and the first surface of the support substrate; and first and second external electrodes spaced apart from each other on the body, wherein the first and second external electrodes are connected to the coil unit and the lead portion, respectively.

According to still another aspect of the present disclosure, a coil component may include: a body including a support substrate, a coil unit including a plurality of turns, a first insulating layer, and a lead portion, wherein the coil unit, the first insulating layer, and the lead portion are disposed on a first surface of the support substrate; and first and second external electrodes spaced apart from each other on the body, and connected to the coil unit and the lead portion, respectively. In a cross-section of the lead portion parallel to the first surface of the support substrate, a line width of an outer end of the lead portion connected to the second external electrode is different from a line width of an inner end of the lead portion opposing the outer end.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
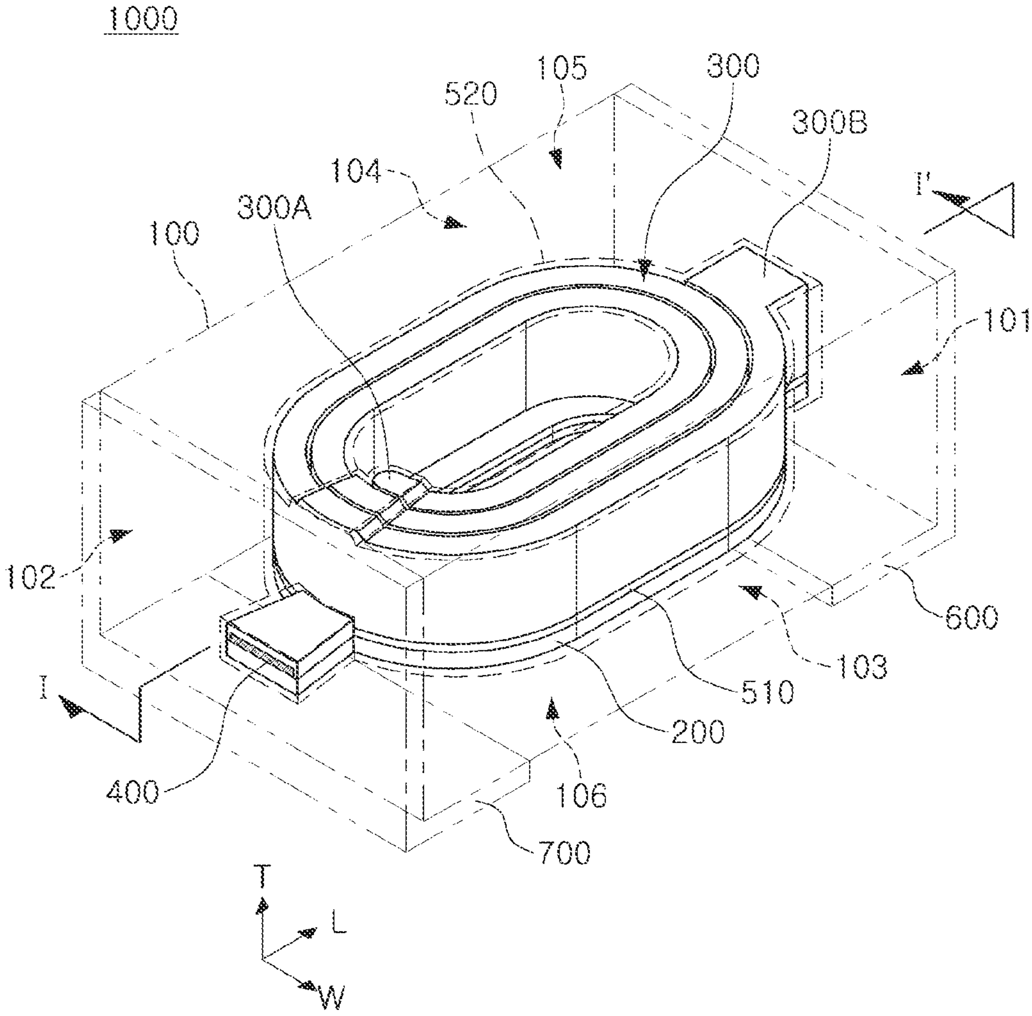
FIG. 1 is a view schematically illustrating a coil component according to an exemplary embodiment in the present disclosure.

In the drawings, an L direction may be defined as a first direction or a length direction, a W direction may be defined as a second direction or a width direction, and a T direction may be defined as a third direction or a thickness direction.

Hereinafter, a coil component according to an exemplary embodiment in the present disclosure will be described in detail with reference to the accompanying drawings, and in the description with reference to the accompanying drawings, the same or corresponding components are denoted by the same reference numerals and duplicate descriptions thereof will be omitted.

Various types of electronic components are used in electronic devices, and various types of coil components may be appropriately used between these electronic components to remove noise.

That is, in an electronic device, a coil component may be used as a power inductor, a high frequency (HF) inductor, a general bead, a high frequency bead (GHz bead), a common mode filter, and the like.

Figure 2:
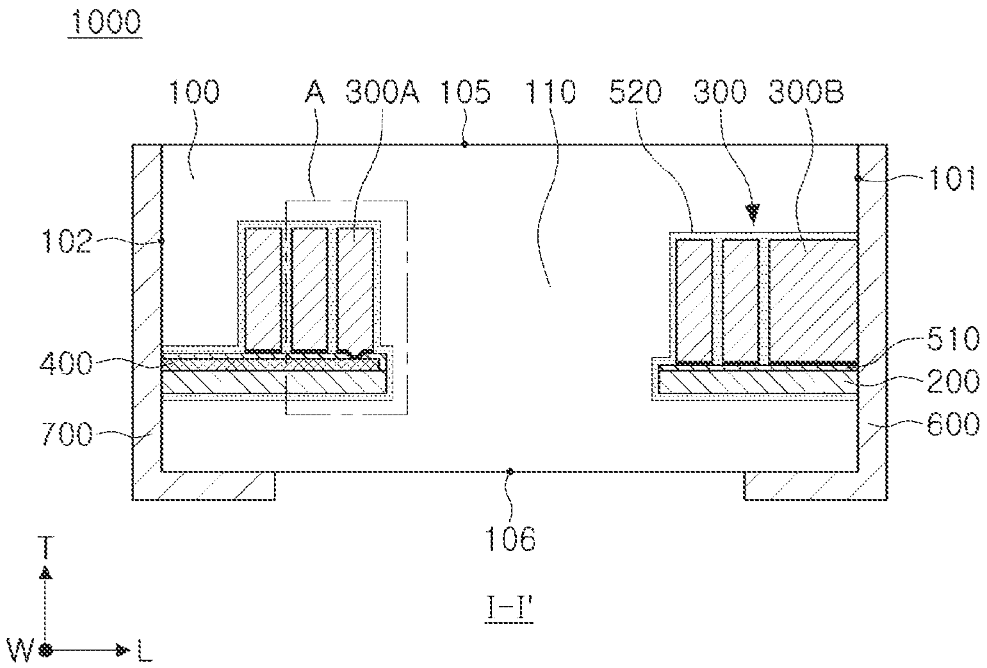
FIG. 2 is a cross-sectional view taken along line I-I' of FIG. 1.
Figure 3:
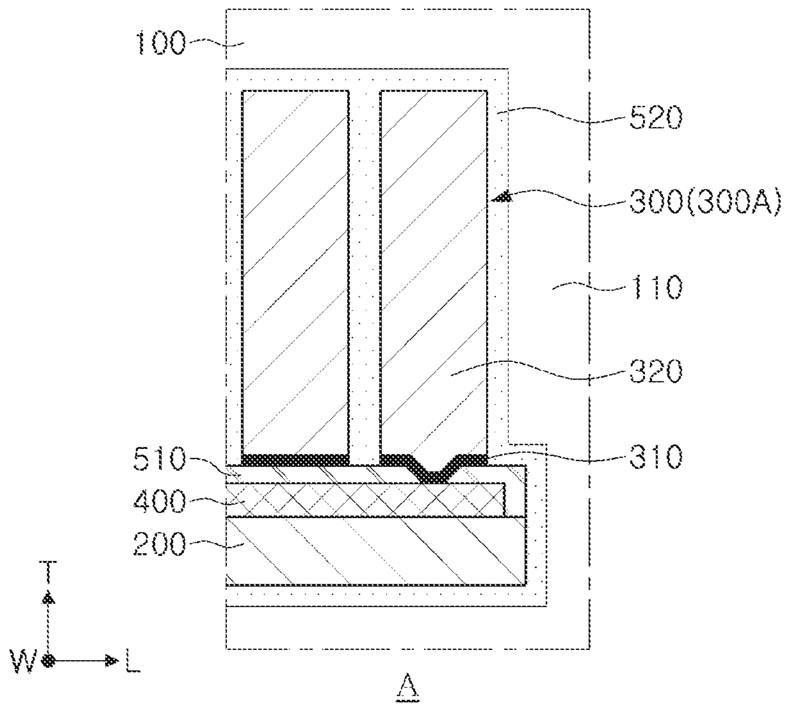
FIG. 3 is an enlarged view of A of FIG. 2.
Figure 4:
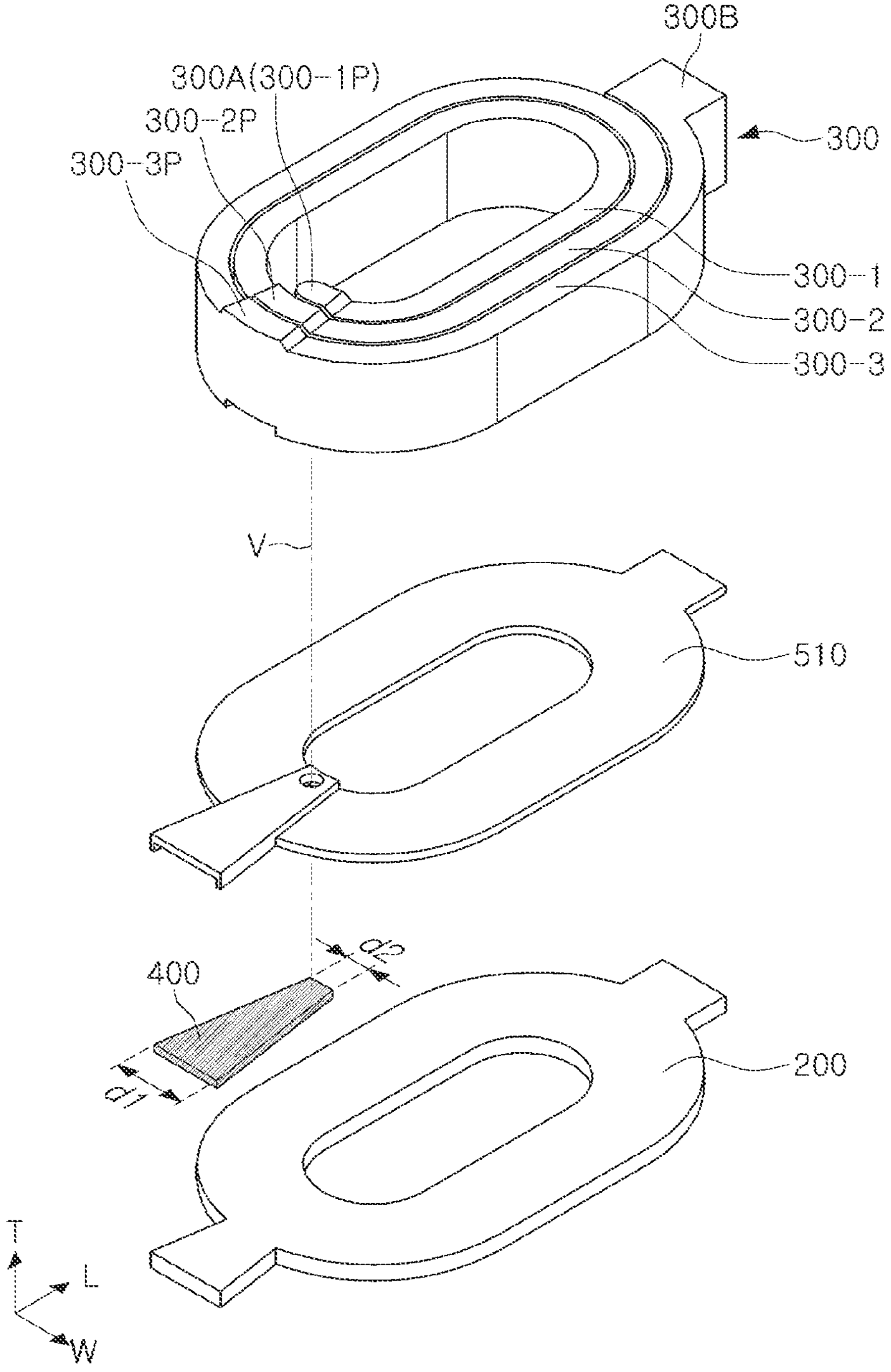
FIG. 4 is an exploded perspective view of a support substrate, a lead portion, a first insulating layer, and a coil unit of FIG. 1.

FIG. 1 is a view schematically illustrating a coil component according to an exemplary embodiment in the present disclosure. FIG. 2 is a cross-sectional view taken along line I-I' of FIG. 1. FIG. 3 is an enlarged view of A of FIG. 2. FIG. 4 is an exploded perspective view of a support substrate, a lead portion, a first insulating layer, and a coil unit of FIG. 1.

Referring to FIGS. 1 through 4, a coil component 1000 according to an exemplary embodiment in the present disclosure includes a body 100, a support substrate 200, a coil unit 300, a lead portion 400, a first insulating layer 510, a second insulating layer 520, and external electrodes 600 and 700.

The body 100 forms an exterior of the coil component 1000 according to this exemplary embodiment, in which the support substrate 200, the coil unit 300, the lead portion 400, the first insulating layer 510, and the second insulating layer 520 are disposed.

The body 100 may have a hexahedral shape as a whole.

Referring to FIGS. 1 and 2, the body 100 includes a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 corresponds to a wall surface of the body 100 that connects the fifth surface 105 and the sixth surface 106 of the body 100. Hereinafter, both end surfaces (one end surface and the other end surface) of the body 100 may refer to the first surface 101 and the second surface 102 of the body, both side surfaces (one side surface and the other side surface) of the body 100 may refer to the third surface 103 and the fourth surface 104 of the body, and one surface and the other surface of the body 100 may refer to the sixth surface 106 and the fifth surface 105 of the body 100, respectively.

Byway of example, the body 100 may be formed such that the coil component 1000 according to the present exemplary embodiment in which the external electrodes 600 and 700 to be described later are formed has a length of 2.5 mm, a width of 2.0 mm, and a thickness of 1.0 mm, has a length of 1.6 mm, a width of 0.8 mm, and a thickness of 0.8 mm, has a length of 1.0 mm, a width of 0.5 mm, and a thickness of 0.5 mm, or has a length of 0.8 mm, a width of 0.4 mm, and a thickness of 0.65 mm, but is not limited thereto. Meanwhile, since the exemplary values for the length, width, and thickness of the coil component 1000 mentioned above refer to values that do not reflect process errors, values within the range that may be recognized as process errors should be considered to correspond to the aforementioned exemplary values.

Here, based on an optical microscope image for a cross-section (LT cross-section) of the body 100 taken in the length direction (L)-thickness direction (T) at a width-directional (W) central portion of the body 100, a length of the coil component 1000 may refer to a maximum value among lengths of a plurality of segments parallel to the length direction L when two boundary lines of the coil component 1000 illustrated in the image facing each other in the length direction L, among outermost boundary lines, are connected. Alternatively, the length of the coil component 1000 may refer to a minimum value among the lengths of the plurality of segments parallel to the length direction L when two boundary lines of the coil component 1000 illustrated in the image of the cross-section facing each other in the length direction L, among the outermost boundary lines, are connected. Alternatively, the length of the coil component 1000 may refer to an arithmetic mean value of at least two of the plurality of segments parallel to the length direction L when two boundary lines of the coil component 1000 illustrated in the image of the cross-section facing each other in the length direction L, among the outermost boundary lines, are connected.

Here, based on an optical microscope image for a cross-section (WT cross-section) of the body 100 taken in the width direction (W)-thickness direction (T) at a length-directional (L) central portion of the body 100, a width of the coil component 1000 may refer to a maximum value among lengths of a plurality of segments parallel to the width direction W when two boundary lines of the coil component 1000 illustrated in the image of the cross-section facing each other in the width direction W, among outermost boundary lines, are connected. Alternatively, the width of the coil component 1000 may refer to a minimum value among the lengths of the plurality of segments parallel to the width direction W when two boundary lines of the coil component 1000 illustrated in the image of the cross-section facing each other in the width direction W, among the outermost boundary lines, are connected. Alternatively, the width of the coil component 1000 may refer to an arithmetic mean value of at least two of the plurality of segments parallel to the width direction W when two boundary lines of the coil component 1000 illustrated in the image of the cross-section facing each other in the width direction W, among the outermost boundary lines, are connected.

Here, based on the optical microscope image for the cross-section (LT cross-section) of the body 100 taken in the length direction (L)-thickness direction (T) at a width-directional (W) central portion of the body 100, a thickness of the coil component 1000 may refer to a maximum value among lengths of a plurality of segments parallel to the thickness direction T when two boundary lines of the coil component 1000 illustrated in the image of the cross-section facing each other in the thickness direction T, among outermost boundary lines, are connected. Alternatively, the thickness of the coil component 1000 may refer to a minimum value among the lengths of the plurality of segments parallel to the thickness direction T when two boundary lines of the coil component 1000 illustrated in the image of the cross-section facing each other in the thickness direction T, among the outermost boundary lines, are connected. Alternatively, the thickness of the coil component 1000 may refer to an arithmetic mean value of at least two of the plurality of segments parallel to the thickness direction T when two boundary lines of the coil component 1000 illustrated in the image of the cross-section facing each other in the thickness direction T, among the outermost boundary lines, are connected.

Alternatively, each of the length, width, and thickness of the coil component 1000 may be measured by a micrometer measurement method. With the micrometer measurement method, each of the length, width, and thickness of the coil component 1000 may be measured by setting a zero point with a gage repeatability and reproducibility (R&R) micrometer, inserting the coil component 1000 according to the present exemplary embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 may include a magnetic material and a resin. Specifically, the body 100 may be formed by stacking at least one magnetic composite sheet in which a magnetic material is dispersed in a resin. However, the body 100 may have a structure other than the structure in which a magnetic material is dispersed in a resin. For example, the body 100 may be formed of a magnetic material such as ferrite.

The magnetic material may be ferrite or metal magnetic powder.

Ferrite may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

Magnetic metal powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

The magnetic metal powder may be amorphous or crystalline. For example, the magnetic metal powder may be Fe—Si—B—Cr-based amorphous alloy powder, but is not limited thereto.

The magnetic metal powder may each have an average diameter of about 0.1 μm to 30 μm, but are not limited thereto.

The body 100 may include two or more types of magnetic materials dispersed in a resin. Here, the different types of magnetic materials refer to that magnetic materials dispersed in a resin are distinguished from each other by any one of an average diameter, a composition, crystallinity, and a shape.

The resin may include, but is not limited to, epoxy, polyimide, liquid crystal polymer, or the like alone or as a mixture.

The body 100 includes a core 110 penetrating a central portion of each of the support substrate 200 and the coil unit 300 to be described later. The core 110 may be formed by filling a through-hole formed in the central portion of each of the support substrate 200 and the coil unit 300 by a magnetic composite sheet, but is not limited thereto.

The support substrate 200 is disposed inside the body 100 to support the coil unit 300 and the lead portion 400 to be described later. The support substrate 200 corresponds to a substrate to be subjected to each process in the process of manufacturing the coil component 1000 according to the present exemplary embodiment.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of materials such as prepreg, Ajinomoto build-up film (ABF), FR-4, a bismaleimide triazine (BT) resin, photo imageable dielectric (PID), a copper clad laminate (CCL), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of a material including a reinforcing material, the support substrate 200 may provide more excellent rigidity. When the support substrate 200 is formed of a material that does not contain woven glass cloth, it is advantageous to reduce an overall thickness of the component.

The support substrate 200 may have a shape corresponding to a shape of a region formed when the coil unit 300 and the lead portion 400 are projected in the thickness direction T of the body 100. The lead portion 400, the first insulating layer 510, and the coil unit 300 are sequentially stacked on a first surface of the support substrate 200, and thereafter, the support substrate 200 is processed in a form corresponding to a shape of a region formed when the coil unit 300 and the lead portion 400 are projected in a direction (thickness direction T of FIGS. 1 and 4) perpendicular to the first surface of the support substrate 200. Through the processing of the support substrate 200, an effective volume of a magnetic material may be increased compared to a size of the same component. Meanwhile, in the processing of the support substrate 200 described above, the first insulating layer 510 to be described later, disposed on the first surface of the support substrate 200 to cover the lead portion 400, is also processed. As a result, a shape of the first insulating layer 510 and a shape of the support substrate 200 may be the same.

The lead portion 400 is disposed on the first surface of the support substrate 200. Specifically, in the case of the present exemplary embodiment, based on the directions of FIGS. 1 and 2, the lead portion 400 is disposed on an upper surface of the support substrate 200 and is spaced apart from the coil unit 300 by the first insulating layer 510, to be described later, covering the lead portion 400. An inner end of the lead portion 400 is connected to an inner end 300A of the coil unit 300 to be described by a via V, and an outer end of the lead portion 400 is exposed to the second surface 102 of the body 100 so as to be in contact with the second external electrode 700 to be described later. That is, the lead portion 400 leads the inner end 300A of the coil unit 300 to be described later to the second external electrode 700 outside the body 100.

The lead portion 400 may be thinner than the coil unit 300 to be described later. As an example, a thickness of the lead portion 400 may be 1 μm or more and 20 μm or less. If the thickness of the lead portion 400 is less than 1 μm, a contact area of the lead portion 400 with the second external electrode 700 may decrease to thus increase direct current resistance Rdc. If the thickness of the lead portion 400 is more than 20 μm, a volume of the lead portion may increase compared to a component having the same volume, to thus reduce an effective volume of the magnetic material in the component. Meanwhile, the thicknesses of the lead portion 400 and the coil unit 300 may refer to lengths of the lead portion 400 and the coil unit 300 in the thickness direction T illustrated in the cross-section in accordance with the length direction (L)-thickness direction (T) at the width-directional (W) center as shown in FIG. 2.

A line width d1 of the outer end of the lead portion 400 may be greater than a line width d2 of the inner end of the lead portion 400. By forming the line width d1 of the outer end of the lead portion 400 to be larger than the line width d2 of the inner end of the lead portion 400, a contact area between the lead portion 400 and the second external electrode 700 may be improved, while the lead portion 400 is formed to be relatively thin. Meanwhile, the line width of the lead portion 400 may refer to a length of the lead portion 400 in the width direction W as shown in FIG. 4. The line width of the lead portion 400 may increase in a direction from the inner end to the outer end. For example, as shown in FIG. 4, the line width of the lead portion 400 may linearly decrease along the length direction L. As another example, the line width of the lead portion 400 may decrease non-linearly along the length direction L.

The lead portion 400 may include a single conductive layer. As an example, the support substrate 200 and the lead portion 400 according to this exemplary embodiment may be manufactured using a copper clad laminate (CCL). In this case, the lead portion 400 may be formed by selectively removing a part of a copper foil of the CCL (subtractive method), thus having a single layer structure including copper (Cu). As another example, the lead portion 400 may be selectively formed by electroless plating or vapor deposition such as sputtering on one surface of the CCL after the copper foil of the CCL is entirely removed. Since the lead portion 400 is formed of a single conductive layer, the lead portion 400 may be formed relatively easily and the thickness of the lead portion 400 may be advantageously reduced.

The first insulating layer 510 is disposed on the first surface of the support substrate 200 to cover the lead portion 400. The first insulating layer 510 prevents a short-circuit between the lead portion 400 and the coil unit 300 to be described later. The first insulating layer 510 may be formed by a vapor deposition method such as chemical vapor deposition, may be formed by applying a liquid insulating material to the first surface of the support substrate 200, or may be formed by stacking an insulating material such as an insulating film on the first surface of the support substrate 200.

A via hole may be formed in the first insulating layer 510 such that a via V for connecting the lead portion 400 and an inner end 300A of the coil unit 300 is disposed. The via hole may be formed by forming the first insulating layer 510 to cover the entire upper surface of the lead portion 400 and subsequently performing processing to open at least a part of the upper surface of the lead portion 400. The via hole may be formed through laser machining or the like, but the scope of the present disclosure is not limited thereto.

The first insulating layer 510 may include at least one of a thermoplastic insulating resin such as polystyrene, vinyl acetate, polyester, polyethylene, polypropylene, polyamide, rubber, acrylic, or the like, a thermosetting insulating resin such as phenol, epoxy, urethane, melamine, alkyd, or the like, a photosensitive insulating resin, parylene, $SiO_x$, or $SiN_x$. The first insulating layer 510 may further include an insulating filler such as an inorganic filler, but is not limited thereto.

The first insulating layer 510 may be formed as a film having a relatively small thickness and may have a shape corresponding to a shape of the first surface of the support substrate 200 on which the lead portion 400 is formed. That is, the first insulating layer 510 may have a conformal film shape. Accordingly, a region of the first insulating layer 510 in contact with the lead portion 400 may protrude relatively compared to a region of the first insulating layer 510 in contact with the first surface of the support substrate 200. For example, a thickness of the first insulating layer 510 may be 1 μm or more and 20 μm or less.

Meanwhile, although FIG. 4 shows that the first insulating layer 510 is disposed on the entire surface of the support substrate 200, this is only an example and the first insulating layer 510 may be disposed only in a partial region of the first surface of the support substrate 200 and cover the lead portion 400.

The coil unit 300 is disposed on the first insulating layer 510 and includes a plurality of turns. The coil unit 300 is disposed inside the body 100 to manifest the characteristics of the coil component. For example, when the coil component 1000 of the present exemplary embodiment is used as a power inductor, the coil unit 300 may serve to stabilize power of an electronic device by storing an electric field as a magnetic field and maintaining an output voltage.

The coil unit 300 may have a planar spiral shape in which at least one turn is formed about a core 110 as an axis. The coil unit 300 includes an inner end 300A disposed adjacent to the core 110 and being an end of the innermost turn 300-1 and an outer end 300B which is an end of the outermost turn 300-3. The inner end 300A of the coil unit 300 is connected to the lead portion 400 by the via V penetrating the first insulating layer 510. The outer end 300B of the coil unit 300 is exposed to the first surface 101 of the body 100 and is in contact with the first external electrode 600, to be described later, disposed on the first surface 101 of the body 100. As described above, the outer end of the lead portion 400 is exposed to the second surface 102 of the body 100 and is in contact with the second external electrode 700, to be described later, disposed on the second surface 102 of the body 100, the coil unit 300 may function as a single coil connected to the first and second external electrodes 600 and 700 together with the lead portion 400 and the via V as a whole.

The via V connects the inner end 300A of the coil unit 300 and the inner end of the lead portion 400 through the first insulating layer 510. In the case of a typical thin-film type coil component, the coil unit includes a coil-shaped pattern formed on each of both surfaces of the support substrate 200, but in the present exemplary embodiment, the coil unit 300 is formed only on the upper surface of the support substrate 200 based on the directions of FIGS. 1 and 2. In this case, the via V and the lead portion 400 are used as components for connecting the inner end 300A of the coil unit 300 to the second external electrode 700.

Each of the coil unit 300, the via V, and the lead portion 400 may be formed of a conductive material such as copper (Cu), aluminum (Al), silver (Ag), tin (Sn), gold (Au), nickel (Ni), lead (Pb), titanium (Ti), chromium (Cr), or an alloy thereof, but is not limited thereto.

The coil unit 300 may include the inner turn 300-1 disposed on an inner side and an outer turns 300-2 and 300-3 disposed on an outer side than the inner turn 300-1. The inner turn 300-1 and the outer turns 300-2 and 300-3 may have protrusions 300-1*p*, 300-2*p*, and 300-3*p* in a region overlapping the lead portion 400, respectively. Areas of the protrusions 300-2*p* and 300-3*p* of the outer turns 300-2 and 300-3 may be larger than an area of the protrusion 300-1*p* of the inner turn 300-1. Specifically, referring to FIG. 4, the coil unit 300 of the present exemplary embodiment includes the first turn 300-1 disposed on the innermost side, the third turn 300-3 disposed on the outermost side, and the second turn 300-2 disposed between the first turn 300-1 and the third turn 300-3, the first to third turns 300-1, 300-2, and 300-3 have protrusions 300-1*p*, 300-2*p*, and 300-3*p* in the region overlapping the lead portion 400 therebelow, and the areas of the protrusions 300-1*p*, 300-2*p*, and 300-3*p* of the first to third turns 300-1, 300-2, and 300-3 increase in order of the protrusions 300-1*p* of the first turn, the protrusion 300-2*p* of the second turn, and the protrusion 300-3*p* of the third turn. Meanwhile, in the case of this exemplary embodiment, the first turn 300-1 may refer to a region from the inner end 300A of the coil unit 300 to a portion immediately before the second protrusion 300-2*p* the protrusion 300-2*p* of the second turn 300-2 in a winding direction of the coil unit 300, the second turn 300-2 may refer to a region from the second protrusion 300-2*p* to a portion immediately before the third protrusion 300-3*p* a protrusion 300-3*p* of the third turn 300-3 along the winding direction of the coil unit 300, and the third turn 300-3 may refer to a region from the third protrusion 300-3*p* to the outer end 300B of the coil unit 300 along the winding direction of the coil unit 300. As a result, each of the first and second turns 300-1 and 300-2 may be formed as 1 turn overall, and the third turn 300-3 may be formed as 0.5 turns overall. Meanwhile, since the number of turns of the coil unit 300 shown in FIG. 4 is only exemplary, the scope of the present disclosure is not limited thereto.

The coil unit 300 includes a first conductive layer 310 disposed on the first insulating layer 510 and a second conductive layer 320 disposed on the first conductive layer 310. The first conductive layer 310 may be a seed layer formed on the first insulating layer 510 to form the second conductive layer 320 by electroplating. The second conductive layer 320 may be an electroplating layer. The first conductive layer 310 may be formed by electroless plating or vapor deposition such as sputtering, may include at least one of copper (Cu), aluminum (Al), silver (Ag), tin (Sn), gold (Au), nickel (Ni), lead (Pb), titanium (Ti), chromium (Cr), molybdenum (Mo), or an alloy thereof, and may be formed of at least one layer. The second conductive layer 320 may be formed by performing electroplating using the first conductive layer 310 as a seed, may include at least one of copper (Cu), aluminum (Al), silver (Ag), tin (Sn), gold (Au), nickel (Ni), lead (Pb), titanium (Ti), chromium (Cr), or an alloy thereof, and may be formed of at least one layer.

A portion of the first conductive layer 310 in the inner turn 300-1 may have a recess forming a space in which the via V is disposed.

The second conductive layer 320 may expose a side surface of the first conductive layer 310, and the second insulating layer 520 to be described later may be in contact with the side surface of the first conductive layer 310. In the present exemplary embodiment, the coil unit 300 may be formed by forming a conductive layer for forming a first conductive layer on the entire upper surface of the first insulating layer 510 (based on the directions of FIGS. 1 to 3), forming a plating resist having an opening corresponding to a shape of the coil unit 300 on an upper surface of the first insulating layer 510 on which the conductive layer for forming a first conductive layer is formed, forming the second conductive layer 320 by filling the opening of the plating resist with a conductive material, removing the plating resist, and subsequently removing a region of the conductive layer for forming a first conductive layer in which the second conductive layer 320 is not formed (i.e., the region of the conductive layer for forming a first conductive layer exposed to the outside because the second conductive layer 320 is not formed on an upper surface thereof). Accordingly, the second conductive layer 320 may be disposed only on the upper surface of the first conductive layer 310 to expose the side surface of the first conductive layer 310. The second insulating layer 520 formed through a follow-up process may be formed to be in contact with each of the side surface of the second conductive layer 320 and the side surface of the first conductive layer 310. Meanwhile, in the process of removing the plating resist or the process of removing the conductive layer for forming a first conductive layer of the manufacturing method described above, the support substrate 200 and the first insulating layer 510 may be removed to have a shape corresponding to a shape of a region to which the lead portion 400 and the coil unit 300 are projected, but the scope of the present exemplary embodiment is not limited thereto.

The second insulating layer 520 covers the coil unit 300. Specifically, the second insulating layer 520 is disposed between the coil unit 300 and the body 100, between the lower surface of the support substrate 200 (based on the direction of FIG. 1) and the body 100, and on the first insulating layer 510 covering each of the lead portion 400. The second insulating layer 520 may be formed on the surface of a structure formed by the support substrate 200, the coil unit 300, and the first insulating layer 510 disposed on the lead portion 400, but is not limited thereto.

The second insulating layer 520, serving to insulate the coil unit 300 and the body 100, may include a known insulating material such as parylene, but is not limited thereto. As another example, the second insulating layer 520 may include an insulating material such as an epoxy resin, not parylene. The second insulating layer 520 may be formed by a vapor deposition method, but is not limited thereto. As another example, the second insulating layer 520 may be formed by stacking an insulating film for forming a second insulating layer on the first surface of the support substrate 200 on which the coil unit 300 is formed, and curing a resultant structure, or may be formed by applying an insulating paste for forming a second insulating layer to the first surface of the support substrate 200 on which the coil unit 300 is formed, and curing a resultant structure.

In this exemplary embodiment, a portion of the second insulating layer 520 disposed in a space between the plurality of turns 300-1, 300-2, and 300-3 of the coil unit 300 may be defined as an insulating wall, and another portion of the second insulating layer 520 disposed on the upper surface of the plurality of turns 300-1, 300-2, and 300-3 of the coil unit 300 and disposed on an upper surface of the insulating wall may be defined as a coil insulating film. According to the manufacturing process, in the second insulating layer 520 of the present exemplary embodiment, the insulating wall and the coil insulating film may be formed together in the same process and integrated with each other so that no boundary is formed therebetween.

The external electrodes 600 and 700 are disposed spaced apart from each other on the sixth surface 106 of the body 100 and are in contact with each of the outer ends of the coil unit 300 and the lead portion 400. Specifically, the first external electrode 600 is disposed on the sixth surface 106 of the body 100 and extends to the first surface 101 of the body 100 so as to be in contact with the outer end 300B of the coil unit 300 exposed to the first surface 101 of the body 100. The second external electrode 700 is disposed on the sixth surface 106 of the body 100 to be spaced apart from the first external electrode 600 and is exposed to the second surface 102 of the body 100 so as to be in contact with the outer end of the lead portion 400 exposed to the second surface 102 of the body 100. Meanwhile, in FIGS. 1 and 2, each of the external electrodes 600 and 700 has an L shape, but this is only an example and the scope of the present exemplary embodiment is not limited thereto. As an example, each of the first and second external electrodes 600 and 700 may be disposed only on the sixth surface 106 of the body 100 and may be connected to the outer end 300B of the coil unit 300 and the outer end of the lead portion 400 by a connection electrode or the like penetrating the body 100 and the support substrate 200. As another example, the first external electrode 600 may cover the first surface 101 of the body 100 to be in contact with and connected to the outer end 300B of the coil unit 300, and may extend to at least a portion of each of the third to sixth surfaces 103, 104, 105, and 106 of the body 100.

The external electrodes 600 and 700 may be formed by a vapor deposition method such as sputtering and/or a plating method, but is not limited thereto and the external electrodes 600 and 700 may be formed by applying a conductive resin including conductive powder such as copper (Cu) to the surface of the body 100 and curing the conductive resin.

The external electrodes 600 and 700 may be formed of a conductive material such as copper (Cu), aluminum (Al), silver (Ag), tin (Sn), gold (Au), nickel (Ni), lead (Pb), chromium (Cr), titanium (Ti), or an alloy thereof, but is not limited thereto. The external electrodes 600 and 700 may be formed in a single layer or multi-layer structure. For example, the external electrodes 600 and 700 may include a first electrode layer including copper (Cu), a second electrode layer including nickel (Ni), and a third electrode layer including tin (Sn), but is not limited thereto.

Meanwhile, although not shown, the coil component 1000 according to this exemplary embodiment may further include a surface insulating layer covering a region of the first to sixth surfaces 101, 102, 103, 104, 105, and 106 of the body 100 on which the external electrodes 600 and 700 are not formed. The surface insulating layer may be used as a plating resist in forming the external electrodes 600 and 700 by electroplating and may prevent plating spreading or the like. In addition, the surface insulating layer may extend to and be disposed on the external electrodes 600 and 700 to cover a region of the external electrodes 600 and 700 excluding a region disposed on the sixth surface 106 of the body 100 to prevent an electrical short-circuit between the coil component 1000 and other components disposed adjacent to the coil component 1000 on a mounting board or the like.

Accordingly, the coil component 1000 according to the present exemplary embodiment may reduce the thickness of the entire component by forming the coil unit 300 having an overall planar spiral shape only on the first surface of the support substrate 200. In addition, since the support substrate 200 supports the entire lower surface of each of the plurality of turns of the coil unit 300, handling ease may increase during the manufacturing process and deformation (bending or sagging) of the coil unit 300 and the lead portion may be prevented during the manufacturing process.

Figure 5:
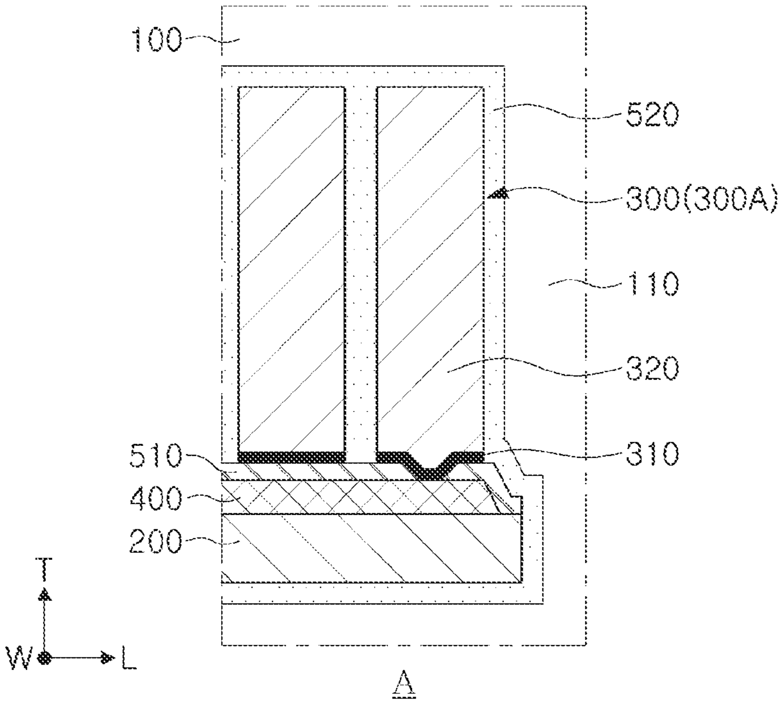
FIG. 5 is an enlarged view of a portion corresponding to A of FIG. 2 according to a modification of the present disclosure.

FIG. 5 is an enlarged view of a portion corresponding to A of FIG. 2 according to a modification of the present disclosure.

Referring to FIG. 5, in the case of this modification, an inner end of the lead portion 400 increases in width from a cross-section perpendicular to the first surface of the support substrate 200 toward the first surface of the support substrate 200.

Specifically, based on the directions of FIGS. 1, 2, 3 and 5, an area of the lower surface of the lead portion 400 in contact with the upper surface of the support substrate 200 is larger than an area of the upper surface of the lead portion 400 facing the support substrate 200, and a sectional area of the lead portion 400 parallel to the upper surface of the support substrate 200 gradually decreases from the lower surface of the lead portion to the upper surface thereof. As a result, based on a cross section perpendicular to the first surface of the support substrate 200, the inner end of the lead portion 400 may have a tapered shape whose width decreases from the upper surface of the lead portion 400 to the lower surface thereof. In this modification, since side surfaces of the lead portion excluding the side surface of the lead portion 400 exposed to the second surface 102 of the body 100 are have a tapered shape in cross-section, thereby preventing a short-circuit between the lead portion 400 and the coil unit 300. That is, the first insulating layer 510 is interposed between the lead portion 400 and the coil unit 300 to prevent an electrical short-circuit therebetween, and since the side surfaces of the lead portion 400 in contact with the first insulating layer 510 are formed to be sloped, breakdown due to non-formation or damage (destruction) of the first insulating layer 510 may be prevented. In the case of this exemplary embodiment, as an example, the support substrate 200, the lead portion 400 formed on the support substrate 200, and the inclined side surface structure of the lead portion 400 may be implemented by selectively removing the copper foil of the copper clad laminate (CCL), but the scope of the modification is not limited thereto. Meanwhile, although not shown, in the case of the exemplary manufacturing method of the present modification described above, surface roughness of a matte surface of the copper foil may be transferred to the first surface of the support substrate 200 to remain. Therefore, the first surface of the support substrate 200 in one exemplary embodiment of the present modification may have relatively high surface roughness, compared to the case where the copper clad laminate is not used, and thus, coupling force between the first insulating layer 510 and the first surface of the support substrate 200 may be improved.

Figure 6:
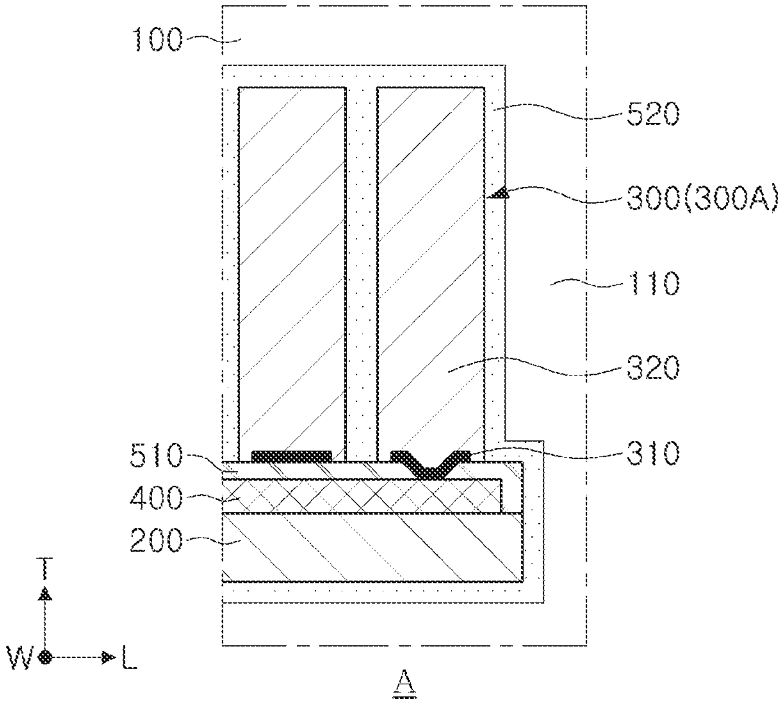
FIG. 6 is an enlarged view of a portion corresponding to A of FIG. 2 according to another modification of the present disclosure.

FIG. 6 is an enlarged view of a portion corresponding to A of FIG. 2 according to another modification of the present disclosure.

Referring to FIG. 6, in the present modification, aside surface of the first conductive layer 310 is covered by the second conductive layer 320. That is, the entire surface of the first conductive layer 310 is covered by the second conductive layer 320 and the first insulating layer 510 and is not exposed to the outside. Accordingly, the first conductive layer 310 is not in contact with the second insulating layer 520. In this modification, in the coil unit 300, a planar spiral-shaped first conductive layer 310 formed on the first surface of the support substrate 200, and a plating resist having an opening corresponding to a shape of the coil unit 300 is formed on the first surface of the support substrate 200. Thereafter, the second conductive layer 320 is formed by filling the opening of the plating resist with a conductive material, and the plating resist is removed. The opening of the plating resist is formed with a line width larger than that of the first conductive layer 310 to expose the side surface of the first conductive layer 310 in a planar spiral shape. Accordingly, the second conductive layer 320 may be formed on the first conductive layer 310 to cover the entire side surface of the first conductive layer 310. The second insulating layer 520 is formed through a follow-up process, and the second insulating layer 520 is not in contact with the side surface of the first conductive layer 310 but in contact with only the surface of the second conductive layer 320. In the present modification, the second conductive layer 320 is formed after the first conductive layer 310 having a planar spiral shape is formed. In the present exemplary embodiment, since a process of removing the first conductive layer 310 is not required, loss of a conductor of the second conductive layer 320 that may occur during the process of removing the first conductive layer 310 may be prevented.

Figure 7:
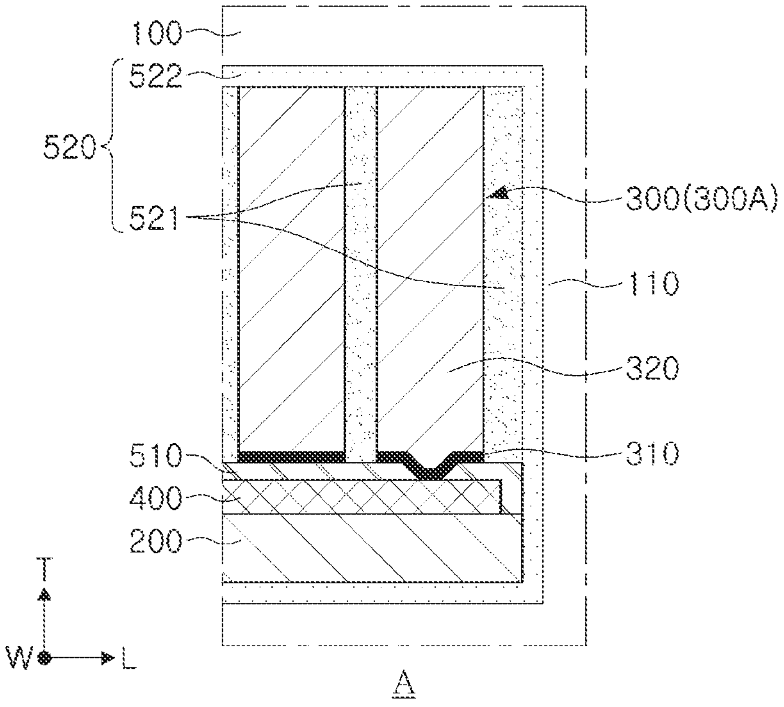
FIG. 7 is an enlarged view of a portion corresponding to A of FIG. 2 according to another modification of the present disclosure.

FIG. 7 is an enlarged view of a portion corresponding to A of FIG. 2 according to another modification of the present disclosure.

Referring to FIG. 7, in the present modification, in the second insulating layer 520, the insulating wall 521 and the coil insulating film 522 form an interface therebetween. As an example, the insulating wall 521 and the coil insulating film 522 may be formed in different processes to form a boundary therebetween. In the case of this modification, as an example, as described in the modification shown in FIG. 6, in the coil unit 300, the first conductive layer 310 in a planar spiral shape is formed on the first surface of the support substrate 200, a plating resist having an opening corresponding to the shape of the coil unit 300 is formed on the first surface of the support substrate 200, and the opening of the plating resist is filled with the second conductive layer 320. Thereafter, unlike the modification illustrated in FIG. 6, a part of the plating resist is not removed after plating the second conductive layer 320 but remains as the insulating wall 521 in this modification. That is, in this modification, the insulating wall 521 may be a permanent resist used when plating the second conductive layer 320 and remaining in a final product. Thereafter, a process of removing portions of each of the plating resist, the first insulating layer 510, and the support substrate 200 is performed, and then the coil insulating film 522 is formed. Accordingly, the coil insulating film 522 is formed on the surface of the structure formed by the insulating wall 521, a permanent resist, the upper surface of the coil unit 300, the first insulating layer 510, and the support substrate 200 and covers the lower surface of the support substrate 200. In the case of the present modification formed by the exemplary method described above, the second conductive layer 320 of the coil unit 300 is formed, the process of removing the plating resist disposed in a space between the turns of the coil unit 300 may not be performed. Therefore, damage and destruction of the first insulating layer 510 that may occur when removing the plating resist disposed in the space between the turns of the coil unit 300 may be prevented, and as a result, a short-circuit between the lead portion 400 and the coil unit 300 due to damage or destruction of the first insulating layer may be prevented.

As set forth above, according to exemplary embodiments in the present disclosure, it is possible to reduce the thickness of the coil component.

While exemplary embodiments have been shown and described above, it will be apparent to those skilled in the art that modifications and variations could be made without departing from the scope of the present disclosure as defined by the appended claims.

What is claimed is:

1. A coil component comprising:
a body;
a support substrate disposed within the body;
a lead portion disposed on a first surface of the support substrate;
a first insulating layer disposed on the first surface of the support substrate to cover the lead portion;
a coil unit including a plurality of turns disposed on the first insulating layer;
a second insulating layer covering the coil unit; and
first and second external electrodes spaced apart from each other on the body, and connected to the coil unit and the lead portion, respectively,
wherein the lead portion is spaced apart from the first external electrode.

2. The coil component of claim 1, wherein
in a cross-section of the lead portion parallel to the first surface of the support substrate, a line width of an outer end of the lead portion exposed to an external surface of the body is greater than a line width of an inner end of the lead portion opposing the outer end.

3. The coil component of claim 2, wherein:
the plurality of turns of the coil unit includes an inner turn and an outer turn disposed outer than the inner turn in the body,
each of the inner turn and the outer turn has a protrusion in a region overlapping the lead portion, and
an area of the protrusion of the outer turn is greater than an area of the protrusion of the inner turn.

4. The coil component of claim 2, wherein,
a line width of the lead portion increases in a direction from the inner end to the outer end in the cross-section parallel to the first surface of the support substrate.

5. The coil component of claim 1, wherein
a length of the lead portion from an inner end of the lead portion to an outer end thereof exposed to an external surface of the body increases toward the first surface of the support substrate.

6. The coil component of claim 1, wherein
the lead portion includes a single conductive layer.

7. The coil component of claim 1, wherein
the coil unit includes a first conductive layer disposed on the first insulating layer and a second conductive layer disposed on the first conductive layer.

8. The coil component of claim 7, wherein
a side surface of the first conductive layer is in contact with the second insulating layer.

9. The coil component of claim 7, wherein
a side surface of the first conductive layer is covered by the second conductive layer.

10. The coil component of claim 7, further comprising a via connecting an inner end of the coil unit and an inner end of the lead portion through the first insulating layer,
wherein a portion of the first conductive layer has a recess forming a space in which the via is disposed.

11. The coil component of claim 1, wherein
the second insulating layer includes an insulating wall disposed in a space between the plurality of turns and a coil insulating film disposed on an upper surface of the plurality of turns of the coil unit and on an upper surface of the insulating wall.

12. The coil component of claim 11, wherein
the insulating wall and the coil insulating film are formed integrally with each other.

13. The coil component of claim 11, wherein
the insulating wall and the coil insulating film have an interface therebetween.

14. The coil component of claim 11, wherein
the coil insulating film covers a second surface of the support substrate opposing the first surface of the support substrate.

15. The coil component of claim 1, wherein
each of the first insulating layer and the support substrate has a shape corresponding to a shape in which the lead portion and the coil unit are projected in a direction perpendicular to the first surface of the support substrate.

16. A coil component comprising:
a body including a support substrate, a coil unit including a plurality of turns, and a first insulating layer, wherein the first insulating layer and the coil unit are sequentially stacked on a first surface of the support substrate in an order of the support substrate, the first insulating layer, and the coil unit;
a lead portion disposed between the first insulating layer and the first surface of the support substrate; and
first and second external electrodes spaced apart from each other on the body,
wherein the first and second external electrodes are connected to the coil unit and the lead portion, respectively, and
a side surface of the lead portion, which is perpendicular to the first surface of the support substrate, is covered by the first insulating layer.

17. The coil component of claim 16, wherein
in a cross-section of the lead portion parallel to the first surface of the support substrate, a line width of an outer end of the lead portion exposed to an external surface of the body is greater than a line width of an inner end of the lead portion opposing the outer end.

18. The coil component of claim 16, wherein:

the plurality of turns of the coil unit includes an inner turn and an outer turn disposed outer than the inner turn in the body, each of the inner turn and the outer turn has a protrusion in a region overlapping the lead portion, and an area of the protrusion of the outer turn is greater than an area of the protrusion of the inner turn.

19. A coil component comprising:

a body including a support substrate, a coil unit including a plurality of turns, a first insulating layer, and a lead portion, wherein the coil unit, the first insulating layer, and the lead portion are disposed on a first surface of the support substrate; and first and second external electrodes spaced apart from each other on the body, and connected to the coil unit and the lead portion, respectively, wherein in a cross-section of the lead portion parallel to the first surface of the support substrate, a line width of an outer end of the lead portion connected to the second external electrode is different from a line width of an inner end of the lead portion opposing the outer end, and the lead portion is spaced apart from the first external electrode.

20. The coil component of claim 19, wherein:

the plurality of turns of the coil unit includes an inner turn and an outer turn disposed outer than the inner turn in the body, each of the inner turn and the outer turn has a protrusion in a region overlapping the lead portion, and an area of the protrusion of the outer turn is different than an area of the protrusion of the inner turn.

* * * * *